United States Patent
Guering

(10) Patent No.: US 8,006,803 B2
(45) Date of Patent: Aug. 30, 2011

(54) LADDER SYSTEM, ESPECIALLY FOR VEHICLES

(75) Inventor: Bernard Guering, Montrabe (FR)

(73) Assignee: Airbus France, Toulouse (FR)

( * ) Notice: Subject to any disclaimer, the term of this patent is extended or adjusted under 35 U.S.C. 154(b) by 243 days.

(21) Appl. No.: 11/915,119

(22) PCT Filed: Jun. 7, 2006

(86) PCT No.: PCT/FR2006/001286
§ 371 (c)(1),
(2), (4) Date: Nov. 20, 2007

(87) PCT Pub. No.: WO2006/131645
PCT Pub. Date: Dec. 14, 2006

(65) Prior Publication Data
US 2008/0210490 A1    Sep. 4, 2008

(30) Foreign Application Priority Data
Jun. 8, 2005 (FR) .................................. 05 05795

(51) Int. Cl.
*E06C 5/00* (2006.01)
(52) U.S. Cl. ............... 182/100; 182/93; 182/95; 182/97; 182/197; 182/206; 114/362
(58) Field of Classification Search ............... 182/93, 182/95, 97, 100, 197, 206; 114/362
See application file for complete search history.

(56) References Cited

U.S. PATENT DOCUMENTS

| | | | | |
|---|---|---|---|---|
| 1,393,048 A * | 10/1921 | Stiles | ........................ | 182/206 |
| 2,381,569 A * | 8/1945 | Bowman | ........................ | 182/77 |
| 2,652,937 A * | 9/1953 | Cutler | ........................ | 182/102 |
| 2,758,770 A | 8/1956 | Wagner | | |
| 2,896,831 A * | 7/1959 | Ellingson | ........................ | 182/97 |
| 2,924,291 A * | 2/1960 | Tunstead | ........................ | 182/156 |
| 3,999,627 A * | 12/1976 | Naka | ........................ | 182/18 |
| 4,061,203 A * | 12/1977 | Spencer et al. | ........................ | 182/214 |
| 4,067,412 A * | 1/1978 | Jackson | ........................ | 182/93 |
| 4,132,288 A * | 1/1979 | Bingham | ........................ | 182/156 |
| 4,257,492 A * | 3/1981 | Rasada et al. | ........................ | 182/206 |
| 4,355,701 A * | 10/1982 | Nicholson | ........................ | 182/97 |
| 4,432,436 A * | 2/1984 | Suiter | ........................ | 182/97 |
| 4,541,507 A * | 9/1985 | Gibellato | ........................ | 182/86 |
| 5,113,782 A * | 5/1992 | McCarty | ........................ | 114/362 |
| 5,287,945 A * | 2/1994 | Thurlow | ........................ | 182/97 |
| 5,458,080 A * | 10/1995 | Jaramillo, Sr. | ........................ | 114/362 |
| 6,547,035 B1 * | 4/2003 | D'Acquisto | ........................ | 182/100 |
| 6,755,146 B1 * | 6/2004 | Garelick et al. | ........................ | 114/362 |
| 6,782,840 B1 * | 8/2004 | Garelick et al. | ........................ | 114/362 |
| 6,941,889 B1 * | 9/2005 | McCrocklin et al. | ........................ | 114/362 |
| 6,945,189 B1 * | 9/2005 | Garelick et al. | ........................ | 114/362 |
| 6,997,283 B2 * | 2/2006 | Wollenberg et al. | ........................ | 182/214 |
| 2004/0159279 A1 | 8/2004 | Garelick et al. | | |

* cited by examiner

OTHER PUBLICATIONS

PCT International Search Report and Written Opinion of the ISR dated Oct. 16, 2006.

*Primary Examiner* — Katherine Mitchell
*Assistant Examiner* — Colleen M Quinn
(74) *Attorney, Agent, or Firm* — Dickinson Wright PLLC

(57) ABSTRACT

The invention relates to a ladder comprising a single post (1) provided with a fixing means (4) on the upper end (1S) thereof, said ladder comprising an anchoring means (9, 10) which is especially adapted to said fixing means (4) and is attached to the wall (7), and foldable supporting arms (3) which are connected to either side of the single post (1) in an articulated manner.

8 Claims, 1 Drawing Sheet

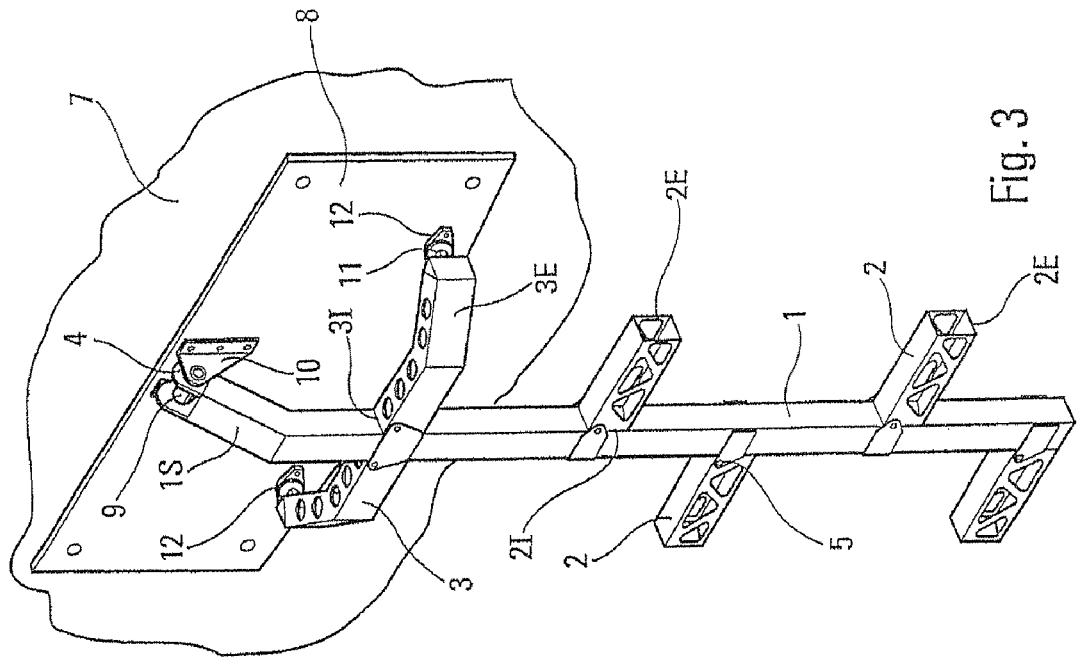
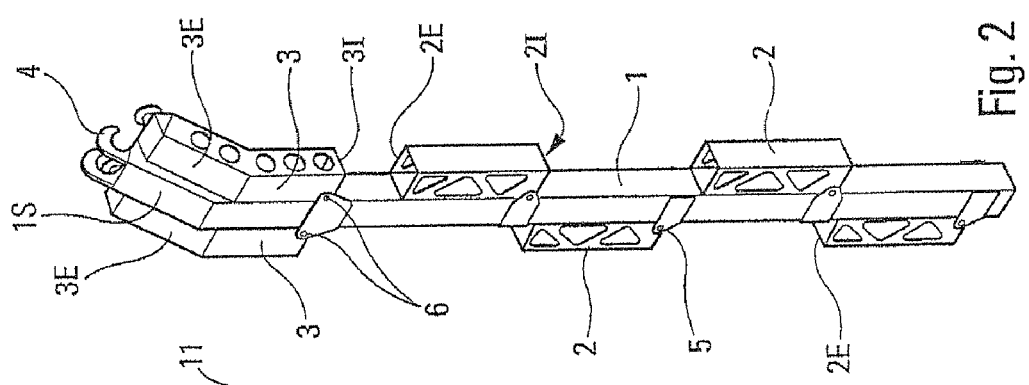
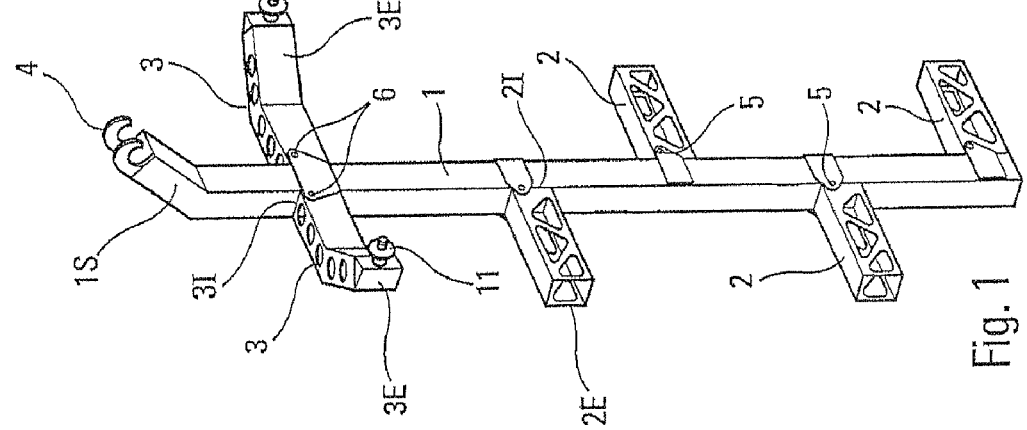

LADDER SYSTEM, ESPECIALLY FOR VEHICLES

The present invention relates to a ladder system which can be used on board vehicles, especially on board civil aircraft, to climb over a wall belonging to said vehicles.

It will be clearly appreciated that the movements of such vehicles make it necessary for the ladder used to be able to be held firmly against said wall during its use. Furthermore, given the lack of space available on board, said ladder must be foldable so that it has a minimum space requirement when it is not being used.

For example, document U.S. Pat. No. 2,924,291 has already disclosed a boat ladder comprising:
- a means for hooking to a wall of said boat;
- a single post provided at its upper part with said hooking means;
- rungs arranged on said single post, on either side thereof, said rungs being hinged by their inner ends to said single post about pins which are orthogonal to said post so that said rungs can assume two end positions, namely:
  - a folded-up position in which said rungs are applied against said single post with their outer end directed toward said upper part of said single post; and
  - a deployed position in which said rungs are arranged orthogonally to said single post and locked downwardly by their inner ends bearing against said single post; and
- means for bearing against said wall, on either side of said single post.

In this known prior system, the stability of the ladder is not very good, in spite of the presence of said bearing means, since the hooking means consists of a wide hook intended to engage with the gunwale of the boat. Furthermore, said bearing means are formed as a single part which is hinged to the single post and, in the folded-up position along said post, said part has a relatively high space requirement.

The object of the present invention is to improve the system of the prior document recalled above in such a way as to achieve a high degree of stability when it is being used and a minimum possible space requirement during periods when it is not being used.

To that end, according to the invention, the ladder system comprising a ladder as mentioned above is noteworthy in that:
- an anchorage specially adapted to said hooking means of said ladder is affixed to said wall; and
- said bearing means comprise two arms which are arranged symmetrically with respect to said single post and are hinged by their inner end to said single post about pins which are orthogonal to said post so that said arms can assume two end positions, namely:
  - a folded-up position in which the two arms are applied against said single post, on either side thereof, with their outer end directed toward said upper part of said single post; and
  - a deployed position in which the two arms are arranged orthogonally to said single post and locked downwardly by their inner end bearing against said single post.

It is advantageous for the outer ends of the two arms to have the shape of arcs such that the two arms together have, in the deployed position, the at least approximate shape of a crescent.

It is also advantageous for the upper part of said single post to have an arc shape corresponding to that of said arms such that, when said arms are in the folded-up position, the outer ends thereof are at least partially superposed with the arc shape of said upper part of the single post.

The arc shapes of the outer ends of said arms and of said upper part of the single post may be angular.

Preferably, said single post, said rungs and said arms are produced from a tube having a square or rectangular cross section.

To further improve the stability of the ladder according to the present invention when in use, it may be assigned a plate bearing said anchorage adapted to the hooking means of the ladder, it being possible for said plate to be fastened to said wall or the like.

Thus, when said arms are in the deployed position, the outer ends thereof can bear against said plate. Co-acting positioning and retaining means are then advantageously provided, in part, at said outer ends of said arms and, in part, on said plate.

Preferably, in order to limit the number of rungs, these rungs are alternately arranged on one side and the other of said single post.

The figures of the appended drawing will clearly show how the invention can be implemented. In these figures, identical references denote like elements.

FIG. 1 is a perspective view of a ladder according to the present invention, in the deployed position.

FIG. 2 is a perspective view, from a different angle, of the ladder of FIG. 1, in the folded-up position.

FIG. 3 is a perspective view, similar to that of FIG. 2, showing said ladder in the deployed position and hooked to its anchorage.

The ladder, according to the present invention and represented in the figures, comprises a single post 1, rungs 2 and two bearing arms 3, said rungs 2 and said arms 3 being hinged to said single post 1.

The single post 1, the rungs 2 and the bearing arms 3 are produced from tubes of quadrangular, especially square, cross section, said tubes being made of aluminum, for example.

The single post 1 is essentially rectilinear, except at is upper part 1S, which is arced angularly with respect to the remaining rectilinear portion of said single post. At its free end, said arced upper part 1S bears a double hook 4.

The rungs 2 are distributed along the single post 1, in an alternating arrangement on either side thereof. Each of the rungs is hinged by its inner end 2I to said single post 1 about an off-center pin 5 which is orthogonal to said post 1.

Thus, the rungs 2 can assume:
- a folded-up end position (see FIG. 2) in which said rungs 2 are applied against the single post 1 with their outer end 2E directed toward the upper part 1S of said post; and
- a deployed end position (see FIGS. 1 and 3) in which said rungs 2 are arranged orthogonally to said single post 1 and locked downwardly (in the opposite direction to the upper part 1S of the single post 1) by their inner ends 2I bearing against the single post 1.

The two bearing arms 3 are arranged symmetrically with respect to the single post 1 and their outer ends 3E are arced angularly in a corresponding manner to the upper end 1S of the single post 1.

The two bearing arms 3 are hinged by their inner end 3I to said single post 1 about off-center pins 6 which are orthogonal to said post. Thus, the two bearing arms 3 can assume:
- a folded-up end position (see FIG. 2) in which they are applied against said single post, on either side thereof, with their arced outer ends 3E directed upwardly and superposed with the arced upper end 1S of the single post 1; and a deployed end position (see FIGS. 1 and 3) in which the two arms 3 are arranged orthogonally to the single post 1, forming a sort of crescent, and locked downwardly by their inner end 3I bearing against said single post 1.

As illustrated in FIG. 3, the ladder shown in FIGS. 1 and 2 can be put to use along a wall 7 by providing a plate 8 which can be fastened to said wall 7 and which bears a fixed anchorage for said ladder that is specially adapted to the double hook 4. In FIG. 3, said anchorage consists of a horizontal rod 9 held between two side mounts 10. Thus, the ladder can be fastened against the wall 7 by hooking the double hook 4 over the rod 9, the two arms 3 then being in the deployed position and bearing against the plate 8 by their outer ends 3E. The arced portions 1S and 3E of the post 1 and of the arms 3 can be designed such that, in the use position shown in FIG. 3, the single post 1 is at least approximately vertical.

To precisely determine the use position of said ladder and improve the stability of the ladder in said use position, co-acting positioning and retaining elements 11, 12 optionally having damping means (for example of the peg/hole type) are provided, on the one hand, at the ends 3E of the arms 3 and, on the other hand, on the plate 8.

The invention claimed is:

1. A ladder system for a wall, said ladder comprising:
a single post, an upper part of which has an arc and is provided with a hooking device;
rungs arranged on said single post, on either side thereof, said rungs being hinged by their inner ends to said single post about pins which are orthogonal to said post so that said rungs can assume two end positions, namely:
a folded-up position in which said rungs are applied against said single post with their outer end directed toward said upper part of said single post; and
a deployed position in which said rungs are arranged orthogonally to said single post and locked downwardly by their inner ends bearing against said single post; and
a bearing device to bear against said wall, on either side of said single post,
said bearing device comprises two arms which are arranged symmetrically with respect to said single post, the outer ends having arcs corresponding to the arc of said upper part of the single post such that the two arms together have, in a deployed position, the at least approximate shape of a crescent, and said arms being hinged by their inner end to said single post about pins which are orthogonal to said post so that said arms can assume two end positions, namely:
a folded-up position in which the two aims are applied against said single post, on either side thereof, with their respective arcs corresponding to and coextensive with the arc of said single post; and
the deployed position in which the two arms are arranged orthogonally to said single post and locked downwardly by their inner end bearing against said single post; and
an anchorage specially configured to said hooking device of said ladder is affixed to said wall.

2. The system as claimed in claim 1, further comprising a plate which bears said anchorage and which can be fastened to said wall.

3. The system as claimed in claim 2, wherein, when said arms are in the deployed position, the outer ends thereof bear against said plate.

4. The system as claimed in claim 3, further comprising co-acting positioning and a retaining device provided, in part, at the outer ends of said arms and, in part, on said plate.

5. A ladder, comprising:
a single post, an upper part of which has an arc shape and is provided with a hooking device;
rungs arranged on said single post, on either side thereof, said rungs being hinged by their inner ends to said single post about pins which are orthogonal to said post so that said rungs can assume two end positions, namely:
a folded-up position in which said rungs are applied against said single post with their outer end directed toward said upper part of said single post; and
a deployed position in which said rungs are arranged orthogonally to said single post and locked downwardly by their inner ends bearing against said single post; and
two arms arranged symmetrically with respect to said single post, the outer ends having arcs corresponding to the arch of said upper part of the single post such that the two arms together have, in the deployed position, the at least approximate shape of a crescent, and said arms being hinged by their inner end to said single post about pins which are orthogonal to said post so that said arms can assume two end positions, namely:
a folded-up position in which the two arms are applied against said single post, on either side thereof, with their respective arcs corresponding to and coextensive with the are of said single post; and
a deployed position in which the two arms are arranged orthogonally to said single post and locked downwardly by their inner end bearing against said single post.

6. The ladder as claimed in claim 5, wherein the arc shapes of the outer ends of said arms and of said upper part of the single post are angular.

7. The ladder as claimed in claim 5, wherein said single post, said rungs and said arms are produced from a tube having a square or rectangular cross section.

8. The ladder as claimed in claim 5, wherein said rungs are alternately on one side and the other of said single post.

* * * * *